(No Model.)
A. MAYER.
SHUT-OFF COUPLING.
No. 581,358. Patented Apr. 27, 1897.
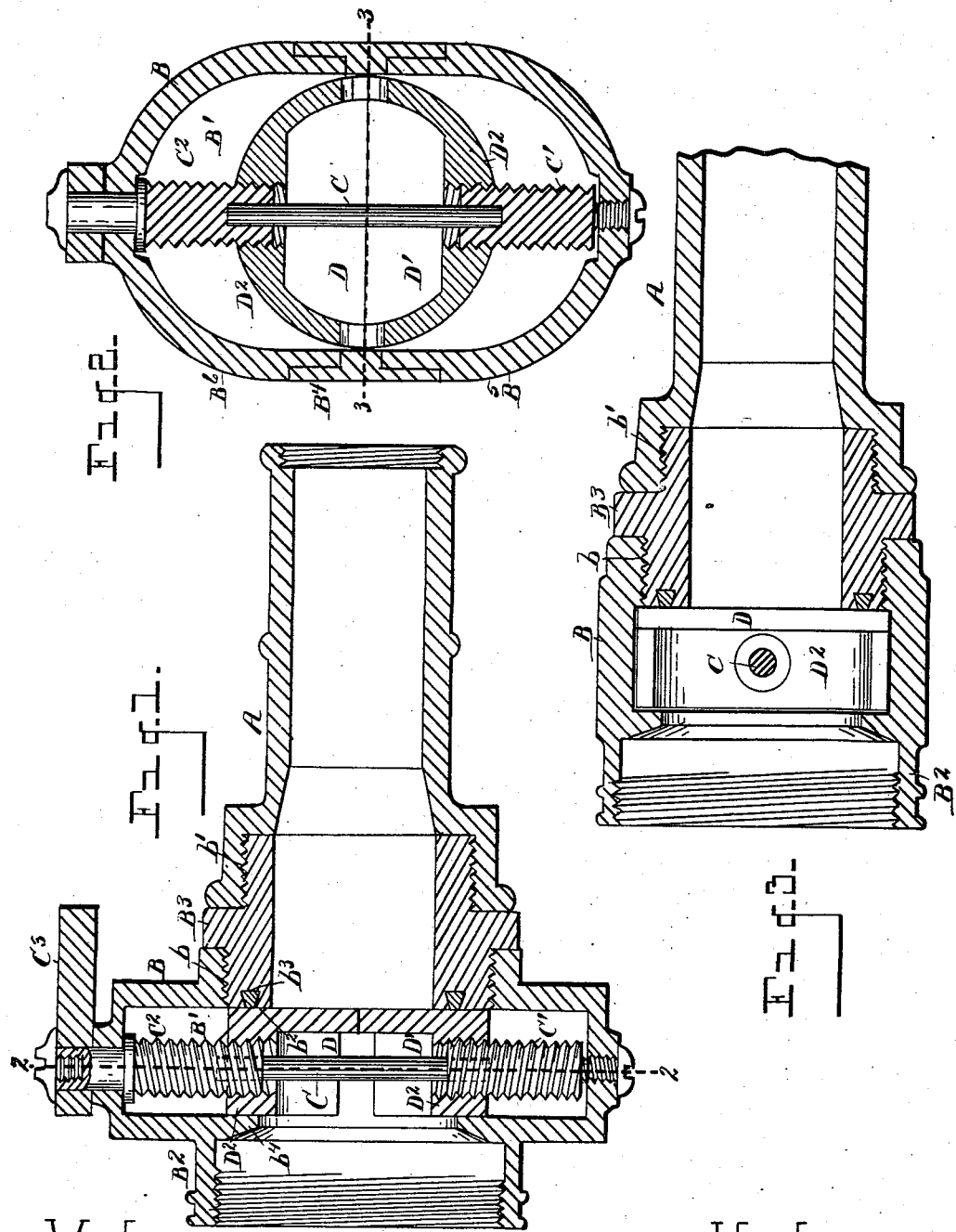
WITNESSES
INVENTOR
Alvarado Mayer
By Newell S. Wright
His Attorney

UNITED STATES PATENT OFFICE.

ALVARADO MAYER, OF DETROIT, MICHIGAN.

SHUT-OFF COUPLING.

SPECIFICATION forming part of Letters Patent No. 581,358, dated April 27, 1897.

Application filed September 10, 1896. Serial No. 605,379. (No model.)

*To all whom it may concern:*

Be it known that I, ALVARADO MAYER, a citizen of the United States, residing at Detroit, county of Wayne, State of Michigan, have invented a certain new and useful Improvement in Shut-Off Couplings; and I declare the following to be a full, clear, and exact description of the invention, such as will enable others skilled in the art to which it appertains to make and use the same, reference being had to the accompanying drawings, which form a part of this specification.

My invention has for its object a novel shut-off coupling of superior construction and utility; and it consists of the construction, combination, and arrangement of devices hereinafter described and claimed, and illustrated in the accompanying drawings, in which—

Figure 1 is a longitudinal section. Fig. 2 is a cross-section on the line 2 2, Fig. 1. Fig. 3 is a section on the line 3 3, Fig. 2.

My invention is intended to provide an improved shut-off coupling especially adapted for a hose-coupling, although I do not limit myself solely to such a use of my invention.

In the drawings, Figs. 1 and 3, I have shown the coupling in connection with a nozzle A, but my invention may be employed either with or without a nozzle, and it may be located in the hose-pipe itself, if desired, or elsewhere.

The device embraced in my invention may be used anywhere where a stop-valve is desired.

As shown in the drawings, my improved coupling consists of a suitable valve-case B, forming an interior chamber B'. As shown, one extremity $B^2$ of the case is adapted for engagement with a hose-pipe, and an opposite extremity is provided with a threaded nipple $B^3$ to have a screw-threaded connection with the case, as indicated at $b$, said nipple also being shown threaded, as indicated at $b'$, to receive the nozzle A. The case B, however, may be constructed to connect with any desired devices. Within the case B, I locate a spindle C, provided with right and left hand screw-threads toward its extremities, as indicated at $C'$ and $C^2$. Said spindle, with its screw-threaded portions, is supported within the case B in any suitable manner and is provided at one extremity with an operating-handle $C^3$, whereby said spindle may be rotated. Within the case are also located segmental valve-plates or gates D and D', seating within the case in any suitable manner. As shown, the nipple $B^3$ is formed at its inner extremity to constitute a valve-seat, as indicated at $b^2$, said seat being shown provided with a suitable packing $b^3$.

The valve-plates D D' are each provided with a flange or shoulder $D^2$, preferably made of metal, with which the valve-spindle has a threaded engagement, said flange or shoulder having an unyielding bearing upon a guide shoulder or flange $d^4$ of the case adjacent thereto, and whereby the valve-plates and their flanges or shoulders have a firm and unyielding bearing upon opposite sides of the valve-chamber B', the face of the metal valve-plates seating on one side of said chamber only and the opposite faces of said flanges or shoulders seating upon the opposite side.

It will be apparent that as the valve-spindle is rotated in one direction the valve-plates will be drawn apart owing to their right and left hand screw-threaded connection with said spindle, while by the opposite rotation of the valve-spindle said plates will be closed. The space intermediate the flanges or shoulders $D^2$, it will be seen, is always open to the water-pressure, while also the water-pressure is admitted into the valve-chamber to the rear of said shoulders and valve-plates.

It is well understood that the water-pressure entering the valve case or chamber will be exerted in every direction wherever it comes into contact with any of the parts, not only in a direction parallel to the axis of the device, but the water flowing freely all about the valve-plates its pressure is exerted also in all directions thereupon where the water comes in contact therewith. By leaving the space intermediate the shoulders or flanges $D^2$ open to the water-pressure said pressure will be exerted against said shoulders at right angles to a direction parallel to the axis of the coupling both outward and inward against said shoulders, so that the valves are thus approximately balanced up with the pressure upon the coupling and may be easily opened and closed under any pressure, very little effort being required to work the device even under high degrees of water-pressure, as there is but little more than the friction of the parts to contend with. This is a very important matter in a shut-off coupling used on fire-hose, as is the design of applicant, owing to the high pressure exerted by the water upon the coupling when subjected to the pressure commonly employed upon such hose. Were the water-pressure upon the valve-plates and shoulders to be exerted thereupon from the rear thereof when in closed position and the water-pressure not admitted intermediate said shoulders it would obviously be a difficult matter to open the valves against such pressure, as there would be no counter-pressure until at least the valves were partially opened. So, also, were the water not admitted to the rear of the valve-plates it would obviously be a difficult matter to close the valves against water-pressure exerted only against the adjacent faces of said shoulders. By my construction, however, in opening the valves the pressure is entirely counterbalanced except for the thickness of the meeting edges of the valve-plates. In starting to open the valve-plates, the pressure in the direction of the movement of the valve-plates is equal to that in the opposite direction, except for the difference of the thickness of the meeting edges of said plates, as above described.

When employed in connection with a hose-nozzle, any tip or nozzle may be used in connection therewith.

It will be obvious that the gates or valve-plates are located within the chamber B' before engaging the nipple B³ with the case of the valve or coupling.

The chamber B' is extended longitudinally of the spindle sufficiently to permit the valve-plates or gates being drawn into the oppositely-elongated portions of said chamber when the coupling is opened to leave a free passage through the coupling.

The case B may be of any suitable construction to support the inner structure and to admit of the engagement of the interior parts therein. For example, as indicated in Fig. 2, the case might be constructed of a central portion or ring B⁴, with end portions B⁵ B⁶ sweated into said central portion. I do not, however, limit myself solely to this construction.

My improved coupling may conveniently be located at the heel of a piece of hose-pipe, to which any desired nozzle may be attached. A coupling so constructed and arranged is of special utility in fire-hose, as it enables the water to be shut off easily and gradually, so as to limit the strain upon the pipe which would ensue were the water cut off instantly.

What I claim as my invention is—

1. A shut-off coupling having in combination, a case forming an interior valve-chamber, a rotatable spindle therewithin having right and left hand threaded portions, and metal valve-plates provided with metal flanges having a threaded engagement with said right and left hand threaded portions of the spindle, the face of the metal valve-plates seating on one side of said chamber only, and the opposite face of said flanges seating upon the opposite side of said chamber, whereby the valve-plates and their flanges have an unyielding bearing upon opposite sides of said chamber, longitudinally of the coupling, substantially as set forth.

2. A shut-off coupling having in combination, a case forming an interior valve-chamber, a right and left hand screw-threaded rotatable spindle journaled in said case, and reciprocatory metal valve-plates D, D' seated on one side of said chamber only, and provided with metal flanges engaged with the right and left hand threaded portions of said spindle, said flanges seated on the opposite side of said chamber, and said valve-plates and their flanges approximately balanced up with the pressure upon the shut-off coupling, substantially as described.

3. A shut-off coupling having in combination a case, a rotatable spindle therewithin, provided with right and left hand screw-threaded portions, valve-plates or gates engaged with said threaded portions of the spindle and seated within the case, and a nipple B³ having a threaded engagement with the case, said valve-plates or gates seated upon the inner end of said nipple, substantially as set forth.

4. A shut-off coupling having in combination a case, a rotatable spindle therewithin, provided with right and left hand screw-threaded portions, and valve-plates or gates engaged with said threaded portions of the spindle and seated within the case, said case provided with a detachable nipple B³ engaged with the case, and said valve-plates or gates seated upon the inner end of said nipple, substantially as set forth.

5. A shut-off coupling having in combination, a case forming an interior valve-chamber, reciprocatory valve-plates seated on one side of said chamber only, and provided with metal shoulders seated on the opposite side of said chamber, and a rotatable spindle journaled in said case having right and left hand threaded portions engaged with said shoulders, the space intermediate said shoulders, and the space to the rear of said shoulders being always open to the water-pressure, whereby the water-pressure will bear upon both sides of said shoulders, and approximately balance the valve-pressure upon said valve-plates and shoulders, substantially as described.

6. A shut-off coupling having in combination a case, a rotatable spindle therewithin, provided with right and left hand threaded portions, metal valve-plates or gates provided with flanges having a threaded engagement with said right and left hand threaded portions of the spindle, the face of the metal valve-plates seating within said case on one side of said spindle, the opposite edge of said flanges having a bearing upon the case on the opposite side of the spindle, substantially as set forth.

In testimony whereof I sign this specification in the presence of two witnesses.

ALVARADO MAYER.

Witnesses:
   PETER ORTWINE,
   N. S. WRIGHT.